United States Patent
Guha et al.

(10) Patent No.: US 10,972,491 B1
(45) Date of Patent: Apr. 6, 2021

(54) ANOMALY DETECTION WITH MISSING VALUES AND FORECASTING DATA STREAMS

(71) Applicant: Amazon Technologies, Inc., Seattle, WA (US)

(72) Inventors: Sudipto Guha, Jersey City, NJ (US); Santosh Kalki, Sammamish, WA (US); Akshay Satish, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 15/977,670

(22) Filed: May 11, 2018

(51) Int. Cl.
- *H04L 29/06* (2006.01)
- *H04L 12/26* (2006.01)
- *G06F 9/455* (2018.01)
- *H04L 12/46* (2006.01)

(52) U.S. Cl.
CPC ...... *H04L 63/1425* (2013.01); *G06F 9/45558* (2013.01); *H04L 12/4633* (2013.01); *H04L 43/045* (2013.01); *G06F 2009/45591* (2013.01); *G06F 2009/45595* (2013.01)

(58) Field of Classification Search
CPC ....... G06F 9/45558; G06F 2009/45595; G06F 2009/45591; H04L 63/1425; H04L 12/4633; H04L 43/045
See application file for complete search history.

(56) References Cited

U.S. PATENT DOCUMENTS

| | | | |
|---|---|---|---|
| 8,370,194 B2 * | 2/2013 | Dwarakanath | G06Q 10/04 705/7.37 |
| 8,655,314 B1 * | 2/2014 | Zang | H04M 3/2281 455/411 |
| 9,197,511 B2 * | 11/2015 | Mathis | H04L 41/145 |
| 9,600,394 B2 * | 3/2017 | Salunke | G06F 11/3612 |
| 9,609,009 B2 * | 3/2017 | Muddu | H04L 63/1416 |
| 9,686,283 B2 * | 6/2017 | Hunt | H04L 63/1483 |
| 10,129,118 B1 * | 11/2018 | Ghare | H04L 43/028 |
| 10,171,335 B2 * | 1/2019 | Maheshwari | H04L 41/065 |
| 10,209,956 B2 * | 2/2019 | Fletcher | G06F 3/04817 |
| 10,333,798 B2 * | 6/2019 | Chan | G06F 11/0778 |
| 10,366,346 B2 * | 7/2019 | Achin | G06Q 10/04 |
| 10,541,858 B2 * | 1/2020 | Taguchi | H04L 41/00 |
| 10,637,745 B2 * | 4/2020 | Naous | H04L 41/064 |
| 2014/0358833 A1 * | 12/2014 | Biem | G06F 11/079 706/21 |
| 2018/0324199 A1 * | 11/2018 | Crotinger | G06F 16/248 |
| 2018/0330083 A1 * | 11/2018 | Abbaszadeh | G06N 20/00 |
| 2019/0138643 A1 * | 5/2019 | Saini | G06F 16/2474 |
| 2019/0140918 A1 * | 5/2019 | Xu | H04L 67/2842 |
| 2019/0236497 A1 * | 8/2019 | Santos | G16H 10/60 |

\* cited by examiner

*Primary Examiner* — Oleg Korsak
*Assistant Examiner* — Feliciano S Mejia
(74) *Attorney, Agent, or Firm* — Nicholson De Vos Webster & Elliott LLP

(57) ABSTRACT

Techniques for seasonality-based anomaly detection and forecast are described. For example, a method of receiving a request to generate forecast for received time series data; performing a seasonality-based anomaly detection and forecast for the received time series data based upon the received request, the seasonality-based anomaly detection and forecasting to utilize a second data structure that reflect anomalies found in a first data structure on the input from the received time series data; and providing a result of the performed seasonality-based anomaly detection and forecast is described.

19 Claims, 15 Drawing Sheets

1. Compute the L2-square distances as a function of $\tau$, i.e., $g(\tau) = \sum_t (f(t) - f(t+\tau))^2$. Note this has a minima of 0 at $\tau = 0$.
2. Normalize $g(\tau)$ to $g_n(\tau)$ between 0 and 1.
3. Compute the thresholded fit between $g(\tau)$ and $(1 - \cos(2\pi\tau/\theta))/2$ — which is the cosine fit with period $\theta \geq 1$ as follows:

$$h(\theta) = \begin{cases} \sum_\tau (g_n(\tau) - (1 - \cos(2\pi\tau/\theta))/2)^2 & \text{when } g_n(\tau) \leq 1/2 \text{ or } (1 - \cos(2\pi\tau/\theta))/2 \leq 1/2 \\ 0 & \text{otherwise} \end{cases}$$

4. Return $\min \theta_0 = \arg\min_\theta h(\theta)$.

FIG. 7

| Timestamp | aapl 0 | amzn 1 | crm 2 | cvs 3 | fb 4 | goog 5 | ibm 6 | ko 7 | pfe 8 | ups 9 | label | Score | Plausible Anomaly Column | Removed | NewScore |
|---|---|---|---|---|---|---|---|---|---|---|---|---|---|---|
| 2015-03-31 03:27:53 | 13479.0 | 53.0 | 3.0 | 0.0 | 8.0 | 6.0 | 0.0 | 1.0 | 0.0 | 1.0 | aapl | 6.078 | 0 | 3,4,6,7,9 | 6.078 |
| 2015-03-31 03:52:53 | 10572.0 | 62.0 | 12.0 | 1.0 | 10.0 | 8.0 | 4.0 | 11.0 | 0.0 | 0.0 | 0 | 5.914 | 0 | 1,3,6,7,9 | 5.914 |
| 2015-04-14 23:02:53 | 9785.0 | 40.0 | 5.0 | 0.0 | 24.0 | 15.0 | 4.0 | 8.0 | 3.0 | 6.0 | 0 | 5.761 | 0 | 1,4,6,7,9 | 5.761 |
| 2015-03-31 03:17:53 | 7479.0 | 59.0 | 2.0 | 0.0 | 17.0 | 10.0 | 1.0 | 2.0 | 0.0 | 0.0 | 0 | 5.648 | 0 | 2,3,4,5,8 | 5.648 |
| 2015-03-31 03:57:53 | 5157.0 | 58.0 | 2.0 | 1.0 | 9.0 | 12.0 | 7.0 | 3.0 | 2.0 | 4.0 | 0 | 5.266 | 0 | 3,6,7,8,9 | 5.266 |
| 2015-04-14 14:12:53 | 2985.0 | 68.0 | 7.0 | 1.0 | 23.0 | 31.0 | 7.0 | 10.0 | 4.0 | 3.0 | 0 | 5.048 | 0 | 1,2,3,4,5,9 | 5.050 |
| 2015-03-31 03:42:53 | 3638.0 | 40.0 | 3.0 | 0.0 | 27.0 | 23.0 | 2.0 | 0.0 | 4.0 | 1.0 | 0 | 4.935 | 0 | 1,2,3,4,6 | 4.936 |
| 2015-04-14 03:32:53 | 3685.0 | 46.0 | 3.0 | 0.0 | 16.0 | 5.0 | 2.0 | 1.0 | 1.0 | 6.0 | 0 | 4.889 | 0 | 3,4,6,7,9 | 4.889 |
| 2015-03-31 20:22:53 | 3738.0 | 77.0 | 3.0 | 1.0 | 27.0 | 40.0 | 8.0 | 7.0 | 1.0 | 6.0 | 0 | 4.860 | 0 | 2,4,6,8,9 | 4.845 |
| 2015-03-31 14:52:53 | 2803.0 | 53.0 | 0.0 | 0.0 | 18.0 | 27.0 | 13.0 | 2241.0 | 1.0 | 3.0 | ko | 4.842 | 7 | 1,5,6,8,9 | 4.847 |
| 2015-04-01 10:42:53 | 3532.0 | 113.0 | 6.0 | 8.0 | 34.0 | 48.0 | 9.0 | 8.0 | 0.0 | 2.0 | 0 | 4.710 | 0 | 1,4,7,8,9 | 4.389 |
| 2015-04-21 10:02:53 | 2461.0 | 22.0 | 6.0 | 2.0 | 10.0 | 8.0 | 2.0 | 6.0 | 1.0 | 94.0 | 0 | 4.567 | 0 | 2,3,5,7,9 | 4.389 |
| 2015-03-31 10:57:53 | 2826.0 | 36.0 | 4.0 | 0.0 | 31.0 | 53.0 | 9.0 | 15.0 | 0.0 | 7.0 | 0 | 4.489 | 0 | 2,5,7,8,9 | 4.390 |
| 2015-03-09 15:37:53 | 1992.0 | 58.0 | 5.0 | 0.0 | 23.0 | 21.0 | 10.0 | 58.0 | 4.0 | 4.0 | 0 | 4.285 | 0 | 1,2,3,4,8,9 | 4.351 |
| 2015-03-16 02:27:53 | 2019.0 | 55.0 | 1.0 | 1.0 | 11.0 | 7.0 | 1.0 | 7.0 | 1.0 | 1.0 | 0 | 4.222 | 0 | 1,3,4,6,9 | 4.243 |
| 2015-03-31 03:57:53 | 2236.0 | 46.0 | 1.0 | 0.0 | 13.0 | 10.0 | 1.0 | 0.0 | 0.0 | 2.0 | 0 | 4.212 | 0 | 2,6,7,8,9 | 4.212 |
| 2015-03-31 03:47:53 | 2164.0 | 53.0 | 0.0 | 0.0 | 10.0 | 43.0 | 1.0 | 2.0 | 0.0 | 0.0 | 0 | 4.192 | 0 | 1,2,4,5,8 | 4.192 |
| 2015-04-14 22:47:53 | 2137.0 | 61.0 | 1.0 | 1.0 | 19.0 | 17.0 | 4.0 | 7.0 | 1.0 | 7.0 | 0 | 4.173 | 0 | 1,4,5,7,9 | 4.183 |
| 2015-03-31 23:32:53 | 2033.0 | 58.0 | 0.0 | 1.0 | 16.0 | 19.0 | 1.0 | 3.0 | 1.0 | 0.0 | 0 | 4.120 | 0 | 2,3,6,7,8 | 4.158 |
| 2015-03-31 19:52:53 | 1950.0 | 99.0 | 1.0 | 0.0 | 26.0 | 48.0 | 4.0 | 15.0 | 1.0 | 3.0 | 0 | 4.038 | 0 | 2,4,6,7,9 | 4.038 |

ANOMALY SCORE 801

ANOMALY SCORE (AFTER REMOVALS) 803

*FIG. 8*

| Timestamp | napl 0 | asvan 1 | crea 2 | cvs 3 | fb 4 | gong 5 | lton 6 | ks 7 | p/e 8 | ape 9 | label | Score | Plausible Anomaly Column | Removed | NewScore |
|---|---|---|---|---|---|---|---|---|---|---|---|---|---|---|---|
| 2015-03-19 23:17:53 | 47.0 | 77.0 | 189.0 | 0.0 | 25.0 | 16.0 | 5.0 | 6.0 | 0.0 | 10.0 | 0 | 5.304 | 2 | 0,3,6,7,9 | 5.304 |
| 2015-04-14 14:52:53 | 240.0 | 53.0 | 6.0 | 0.0 | 18.0 | 37.0 | 15.0 | 241.0 | 0.0 | 5.0 | ks | 4.619 | 7 | 1,4,5,6,9 | 4.617 |
| 2015-03-31 08:27:53 | 13479.0 | 83.0 | 5.0 | 0.0 | 8.0 | 6.0 | 0.0 | 1.0 | 0.0 | 1.0 | napl | 4.589 | 0 | 1,2,3,5,8 | 4.568 |
| 2015-03-31 03:22:53 | 11872.0 | 62.0 | 12.0 | 0.0 | 19.0 | 18.0 | 4.0 | 11.0 | 0.0 | 0.0 | 0 | 4.210 | 0 | 1,4,6,7,8,9 | 4.226 |
| 2015-03-16 02:57:53 | 6107.0 | 47.0 | 0.0 | 1.0 | 17.0 | 5.0 | 0.0 | 1.0 | 0.0 | 2.0 | napl | 3.931 | 0 | 2,4,5,8,9 | 3.928 |
| 2015-04-11 20:12:53 | 8201.0 | 44.0 | 5.0 | 0.0 | 22.0 | 23.0 | 5.0 | 3.0 | 0.0 | 3.0 | 0 | 3.846 | 0 | 3,4,5,6,9 | 3.843 |
| 2015-03-19 23:02:53 | 38.0 | 74.0 | 25.0 | 0.0 | 23.0 | 28.0 | 6.0 | 8.0 | 1.0 | 7.0 | 0 | 3.649 | 2 | 0,1,4,7,9 | 3.657 |
| 2015-04-21 18:12:53 | 109.0 | 56.0 | 11.0 | 0.0 | 44.0 | 27.0 | 389.0 | 45.0 | 5.0 | 1.0 | fb | 3.647 | 6 | 0,2,4,7,9 | 3.693 |
| 2015-03-16 07:07:53 | 37.0 | 30.0 | 0.0 | 0.0 | 654.0 | 7.0 | 0.0 | 3.0 | 0.0 | 8.0 | 0 | 3.631 | 4 | 0,1,3,6,9 | 3.629 |
| 2015-03-11 23:27:53 | 63.0 | 1673.0 | 1.0 | 1.0 | 27.0 | 36.0 | 12.0 | 8.0 | 3.0 | 3.0 | sasan | 3.513 | 1 | 2,4,5,6,7 | 3.517 |
| 2015-03-19 20:57:53 | 80.0 | 55.0 | 9.0 | 2.0 | 30.0 | 411.0 | 13.0 | 12.0 | 0.0 | 4.0 | 0 | 3.489 | 5 | 0,3,4,6,7 | 3.448 |
| 2015-03-20 23:07:53 | 117.0 | 63.0 | 1.0 | 1.0 | 17.0 | 33.0 | 155.0 | 13.0 | 0.0 | 2.0 | lton | 3.415 | 6 | 0,1,5,7,9 | 3.422 |
| 2015-03-16 03:02:53 | 3240.0 | 42.0 | 0.0 | 0.0 | 16.0 | 9.0 | 1.0 | 1.0 | 0.0 | 0.0 | 0 | 3.374 | 0 | 1,2,3,5,7,9 | 3.273 |
| 2015-04-16 17:42:53 | 63.0 | 59.0 | 5.0 | 0.0 | 550.0 | 13.0 | 2.0 | 12.0 | 2.0 | 4.0 | 0 | 3.292 | 4 | 2,3,5,6,9 | 3.292 |
| 2015-03-31 08:37:53 | 5137.0 | 38.0 | 2.0 | 1.0 | 9.0 | 12.0 | 1.0 | 3.0 | 0.0 | 0.0 | 0 | 3.180 | 0 | 1,2,4,7,9 | 3.179 |
| 2015-04-22 12:02:53 | 33.0 | 59.0 | 8.0 | 1.0 | 18.0 | 31.0 | 106.0 | 14.0 | 3.0 | 3.0 | 0 | 3.105 | 6 | 1,3,4,5,7 | 3.139 |
| 2015-04-01 21:07:53 | 277.0 | 81.0 | 6.0 | 0.0 | 21.0 | 228.0 | 4.0 | 9.0 | 2.0 | 207.0 | 0 | 3.023 | 5 | 1,2,3,7,9 | 3.033 |
| 2015-03-20 23:02:53 | 138.0 | 53.0 | 5.0 | 0.0 | 27.0 | 52.0 | 98.0 | 5.0 | 0.0 | 6.0 | 0 | 3.018 | 6 | 0,1,5,7,9 | 3.038 |
| 2015-03-22 22:27:53 | 53.0 | 67.0 | 2.0 | 0.0 | 27.0 | 11.0 | 83.0 | 10.0 | 2.0 | 2.0 | lton | 3.014 | 6 | 0,2,4,7,9 | 3.032 |
| 2015-03-09 19:07:53 | 540.0 | 60.0 | 26.0 | 1.0 | 24.0 | 18.0 | 4.0 | 12.0 | 0.0 | 7.0 | crea | 2.983 | 2 | 1,3,4,7,9 | 2.991 |

ANOMALY SCORE 901

ANOMALY SCORE (AFTER REMOVALS) 903

FIG. 9

TIME SERIES DATA 1001

| Timestamp | aapl | amzn | crm | cvs | fb | goog | ibm | ko | pfe | ups |
|---|---|---|---|---|---|---|---|---|---|---|
| 2015-03-19 23:17:53 | | 77 | 189 | 0 | 25 | | | | 0 | |
| 2015-04-14 14:52:53 | 290 | | 6 | 0 | | | | 2241 | 0 | |
| 2015-03-31 03:27:53 | 13479 | | | | 8 | | 0 | 1 | | 1 |
| 2015-03-31 03:22:53 | 10372 | 62 | 12 | 1 | | 8 | | | | |
| 2015-03-16 02:57:53 | 8107 | 47 | | 0 | | | 0 | 1 | | |
| 2015-04-14 23:12:53 | 8301 | 44 | | | | | 6 | 3 | 1 | 2 |
| 2015-03-19 23:02:53 | | 58 | 55 | 0 | | 28 | | | | |
| 2015-04-21 14:12:53 | | | | 1 | 44 | | 139 | | 5 | |
| 2015-03-11 20:57:53 | 63 | 1673 | 9 | 1 | | | 12 | 8 | 5 | 4 |
| 2015-03-13 20:57:53 | | 55 | 1 | 1 | 17 | 411 | | | 5 | 2 |
| 2015-04-20 20:07:53 | | | 0 | 1 | 16 | | 125 | | | |
| 2015-03-16 03:02:53 | 5249 | 59 | | | 530 | | 1 | | 0 | |
| 2015-04-03 17:42:53 | 63 | | 5 | 1 | | 12 | 1 | 12 | 0 | 0 |
| 2015-03-31 03:37:53 | 5157 | | | | | | 106 | | 2 | 3 |
| 2015-04-22 12:52:53 | 33 | | | | 21 | 238 | | | | |
| 2015-04-01 21:07:53 | 277 | 53 | | 1 | | 32 | 4 | | 0 | 207 |
| 2015-04-20 20:02:53 | | 67 | | | 27 | 14 | 98 | | | 2 |
| 2015-03-28 22:27:53 | | | | | | | 84 | | | |
| 2015-03-09 19:07:53 | 542 | | 35 | | | 18 | 4 | | 0 | |

ANOMALY DETECTION WITH MISSING VALUES AND FORECASTING DATA STREAMS

BACKGROUND

Forecasting a time series has attracted a lot of attention. While many forecasting algorithms exist, the development of general purpose data dependent non-parametric forecasting algorithm has been limited.

BRIEF DESCRIPTION OF DRAWINGS

Various embodiments in accordance with the present disclosure will be described with reference to the drawings, in which:

FIG. 7 illustrates an embodiment of seasonality determination in detail.

FIG. 8 illustrates a table showing the impact of missing values on anomaly scores using the above detailed approaches.

FIG. 9 illustrates a table showing the impact of missing values on anomaly scores using the above detailed approaches for normalized data.

FIG. 10 illustrates an example of the time series data of FIG. 9 with selected data removed.

DETAILED DESCRIPTION

Various embodiments of methods, apparatus, systems, and non-transitory computer-readable storage media for anomaly detection with missing values and forecasting data streams are described.

Forecasting time series data has attracted a lot of attention. While many forecasting algorithms exist, the development of general purpose data dependent non-parametric forecasting algorithm has been limited. Some non-parametric methods use a state-space learning approach (such as learning the state-space of a Markov process) which cannot be solved efficiently or require too many observations.

Forecasting scenarios frequently have anomalies, missing values, and utilize multiple parameters. An inclusion of an anomalous point can affect a forecast, and the presence of many parameters makes it harder to understand and explain the impact of including a specific point. A solution to this is to remove anomalies first and then forecast. However, as forecasting scenarios often correspond to scenarios where data is partially missing a solution for missing value imputation is to predict/forecast/impute the missing values first and then perform anomaly detection. As such, there is a circular dependency between anomaly detection and forecasting via missing value imputation. It is quite possible that imperfect forecasting introduces false anomalies which in turn provide biased and imperfect forecasts.

Embodiments detailed herein address the circularity problem and address the problems of anomaly detection and/or forecasting. An anomaly (what is unexpected) is fundamentally connected with the notion of forecasting (what is expected)—which is the fundamental core of a circular dependence exhibited by the traditional ideas above. A premise of the task of anomaly detection is that given a collection of old observations and a new one, we can distinguish between "somewhat expected" and "unexpected." In the latter case, the new observation is an anomaly. Modifying the data structures, information, procedures, etc. used in an anomaly detection to determine "what value of the new observation would produce a low anomaly score (be somewhat expected)" results in a forecast.

Embodiments detailed herein describe methods, apparatuses, systems, and non-transitory computer-readable storage media for forecasting time series data and/or anomaly detection. For example, embodiments detailed herein allow for anomaly detection on partial input or missing data. As data curation is costly and slow—the ability to detect anomalies on partial input is an improvement to computer technology.

Figure 1:
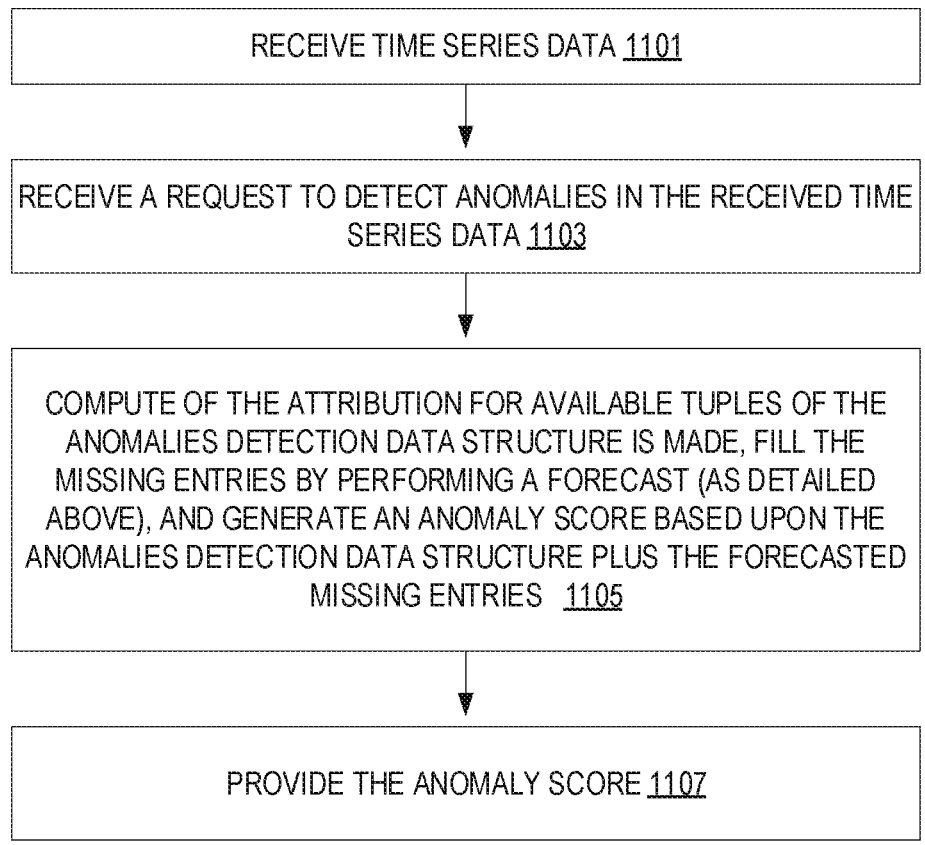
FIG. 1 illustrates embodiments of a system for performing time series data anomaly detection and forecasting in a server context.

FIG. 1 illustrates embodiments of a system for performing time series data anomaly detection and forecasting in a server context. In most embodiments, the anomaly detection and forecasting are to be performed with missing values in the time series data. In this illustration, the server is one or more servers of a web services provider 101, however, discussions below are applicable to non-web services provider servers (such as a server of an enterprise).

The web services provider 101 receives, via a front end 103, time series data from one or more data sources 109(A), 109(B). External data sources 109(A) may include, but are not limited to, sensors (e.g., vehicles, medical devices, audio and/or video based, etc.), other servers (e.g., website servers, commerce servers, supply chain servers, etc.), etc. Internal data sources 109(B) may include, but are not limited to, sensors (e.g., network traffic, etc.), servers and their services within the web services provider (e.g., website servers, commerce servers, supply chain servers, etc.), etc.

The front end 103 forwards, and/or causes to be stored, the received time series data from the one or more data sources 109(A), 109(B) into one or more data structures 113 and 115 of one more data stores 111. In some embodiments, the front end 103 formats the data into a proper format for the structure(s) 113 and 115. The time series data may be "directly" stored, or passed to a data forecast and/or anomaly detection service (or services) 105 which formats the data (as needed) prior to storage in the structure(s) 113 and 115.

Note that the data forecast and/or anomaly detection service (or services) 105 may be a combined service, or separate services.

The data forecast and/or anomaly detection service (or services) 105 utilizes the two or more data structures 113 and 115 (at times referred to as forests). The first forest (anomalies detection data structure 113) is used to filter out anomalies in the input time series stream and is updated on every input and the second forest (forecast data structure 115) is used to forecast. Values are added to the second forest (forecast data structure 115) if and only if they pass the filter using the first forest (anomalies detection data structure 113). In some embodiments, sparse/sporadic anomalies are filtered out by the first forest (anomalies detection data structure 113) and do not affect forecasts. If an underlying distribution is changed, then the first forest (anomalies detection data structure 113) will eventually adapt to the new data, and those values will be considered by the forecasting forest (forecast data structure 115) and the forecast will eventually follow the new distribution. The use of two data structures may make forecasting resilient from anomalies in a data stream. Note that if all anomalies were (programmatically) dropped then the anomalies detection data structure 113 would not get updated in the event of a change or drift of the data. At the same time if anomalies are not dropped then the forecast data structure 115 would be naturally error prone.

In some embodiments, seasonality of the time series data is detected by the data forecast and/or anomaly detection service (or services) 105 and used to modify the above described data structures (e.g., 113 and 115) to be better suited in the context of forecasting. For example, suppose that it was known that sales were variable day to day in a predictable pattern due to standard human activity and weekends, but the overall volume corresponding to market penetration is not known week over week; then the observations corresponding to the last 7 days allows for most of the information required to predict the sales of this month. Sales of 8 days earlier may not be as important in comparison to the last 7.

If analyzing weekly data, basic shingling would produce shingles (snippets) corresponding to "su, mo, tu, we, th, fr, sa" followed by "mo, tu, we, th, fr, sa, su." In this example, the values of "sa" and "su" are compared in the same (last) column. In some embodiments, a shingle comprises at least one data point in a sliding window. In some embodiments, the shingles are rotated to better align with the data.

In some embodiments, the data forecast and/or anomaly detection service (or services) 105 utilizes a random cut forests (RCFs) approach to forecasting, where the set of values are partitioned at random, are amenable to updates in a dynamic data stream. In particular, a data structure that supports anomaly detection in RCF is used to provide explainable forecasts that do not affect anomaly detection.

RCF is data dependent, does not have too many parameters, and has demonstrated the ability to vend explanations (influencers of the anomaly score—which dimension contributed how much to the data), timing based attribution analysis (at which exact point is the anomaly spotted—while this is easy for a human, this is not obvious for a machine), and directionality (by how much, possibly as a rough estimate, should a value change to record that measurement as acceptable/non-anomalous). In RCF, given a sequence of d-dimensional values $x_1, x_2, \ldots, x_t \ldots$ the current reading $x_1$ is "lifted/projected" to the snippet $x_{(t-k+1)}, \ldots, x_1$ where k is known as the "shingle size." These snippets overlap each other (similar to shingles on a roof) and provide local context to the reading $x_t$.

Random cut forest functions as follows. The forest consists of trees—each tree is built from a sample of the data. Assume that the points (these are shingled points) have been chosen for each tree. Given a set of points P:

(A) Find the bounding box in the d→|dimensional space;
(B) Suppose the length of the sides of the bounding box are $l_1, l_2, \ldots, l_d$. A dimension i with probability $l_i/\Sigma_j l_j$, is chosen;
(C) The dimension is partitioned choosing a value at random and the point set is divided. This is repeated on each side, as long as there is some $l_j > 0$ which holds is the point set has more than 1 distinct point.

Given a point p and the tree T, the expected inverse height of the point p when inserted into T. Averaging over the forest, a raw score of the point is derived and then multiplied $\log_2 q$ (where q is the number of samples in each tree). For point p which has duplicates in the tree T, a different expression is computed. The height of the (copy of that) point in the tree is found and if we have z copies at height h, 1/(h+log z) is returned.

The circles with numbers in them give an exemplary flow.
At circle 1A or 1B, a data source provides time series data to the front end 103.

The front end forwards this data to data store(s) 111 at circle 2. As detailed, this forwarding may include formatting and may go through the data forecast and/or anomaly detection service(s) 105.

At circle 3, a request is received from a user device 121 to perform and/or modify a forecast on the received time series data. Examples of what may be in the request are shown in a later figure. Typically, the request is in the form of an HTTP request interacting with a user interface.

The front end 103 then forwards the request to the data forecast and/or anomaly detection service(s) 105 for handling at circle 4.

The data forecast and/or anomaly detection service(s) 105 interacts with the anomalies detection data structure 113 and forecast data structure 115 to generate the forecast at circle 5. Examples of such interaction are detailed herein including performing a RCF function.

A result of the interaction(s) is consumed by the data forecast and/or anomaly detection service(s) 105 at circle 6 and provided to the front end 103 at circle 7.

The forecast is then provided to the user device 121. Typically, the forecast is provided as a part of a graphical user interface generated by the web services provider 101. However, in some embodiments, data is provided instead.

Figure 2:
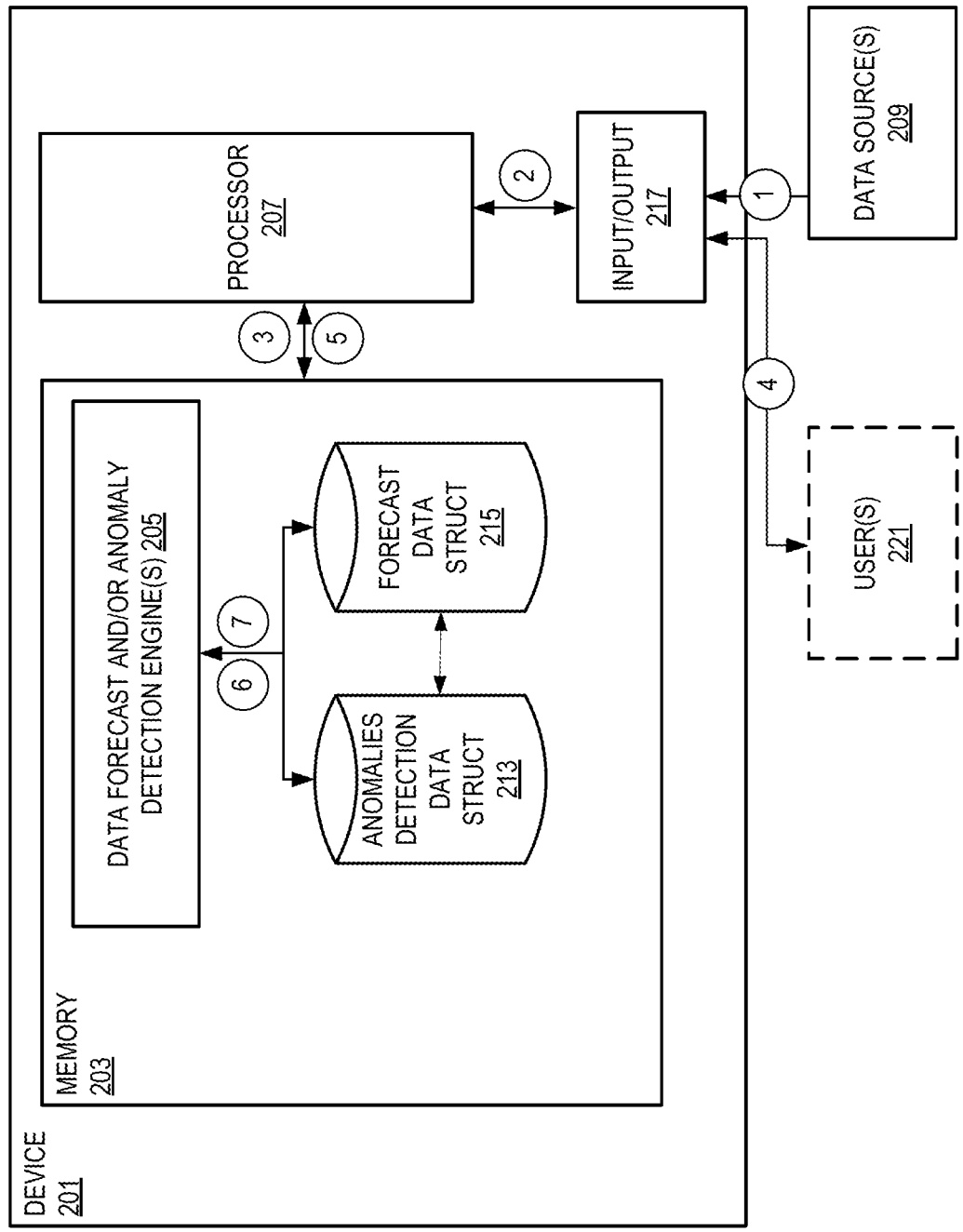
FIG. 2 illustrates embodiments of a system for performing time series data anomaly detection and forecasting in a device context.

FIG. 2 illustrates embodiments of a system for performing time series data anomaly detection and forecasting in a device context. In most embodiments, the anomaly detection and forecasting is to be performed with missing values in the time series data. In this particular illustration, the device 201 is a standalone device having memory 203 to store a data forecast and/or anomaly detection engine 205 that provides the functionality of the data forecast and/or anomaly detection service(s) 105 (albeit locally) and the data structures detailed above. Further, a processor 207 executes the data forecast and/or anomaly detection engine 205.

The device 201 receives time series data via input/output mechanism(s) 217 from one or more data sources 209. Data sources 209 may include, but are not limited to, sensors (e.g., vehicles, medical devices, audio and/or video based, etc.), other computers (e.g., website servers, commerce servers, supply chain servers, etc.), etc. The input/output mechanism(s) 217 may include a display, keyboard, mouse, interconnect, etc.

The input/output mechanism(s) 217 forwards, and/or causes to be stored, the received time series data from the one or more data sources 209 into one or more data structures 213 and 215. In some embodiments, the time series data is formatted by the data forecast and/or anomaly detection engine 205.

The circles with numbers in them give an exemplary flow. At circle 1, a data source provides time series data to the device 201.

The input/output mechanism(s) 217 forwards this data at circle 2. As detailed, this forwarding may include formatting and may go through the data forecast and/or anomaly detection engine 205 via the processor 207 at circle 3.

At circle 4, a request is received from a user 221 to perform and/or modify a forecast on the received time series data. Examples of what may be in the request are shown in a later figure.

The input/output mechanism(s) 217 then forwards the request to the data forecast and/or anomaly detection engine 205 for handling at circle 5.

The data forecast and/or anomaly detection engine 205 interacts with the anomalies detection data structure 113 and forecast data structure 215 to generate the forecast at circle 6. Examples of such interaction are detailed herein including performing a RCF routine.

A result of the interaction(s) is consumed by the data forecast and/or anomaly detection engine 205 at circle 7 and provided to the user 221. Typically, the forecast is provided as a part of a graphical user interface generated by the device. However, in some embodiments, data is provided instead.

Figure 3:
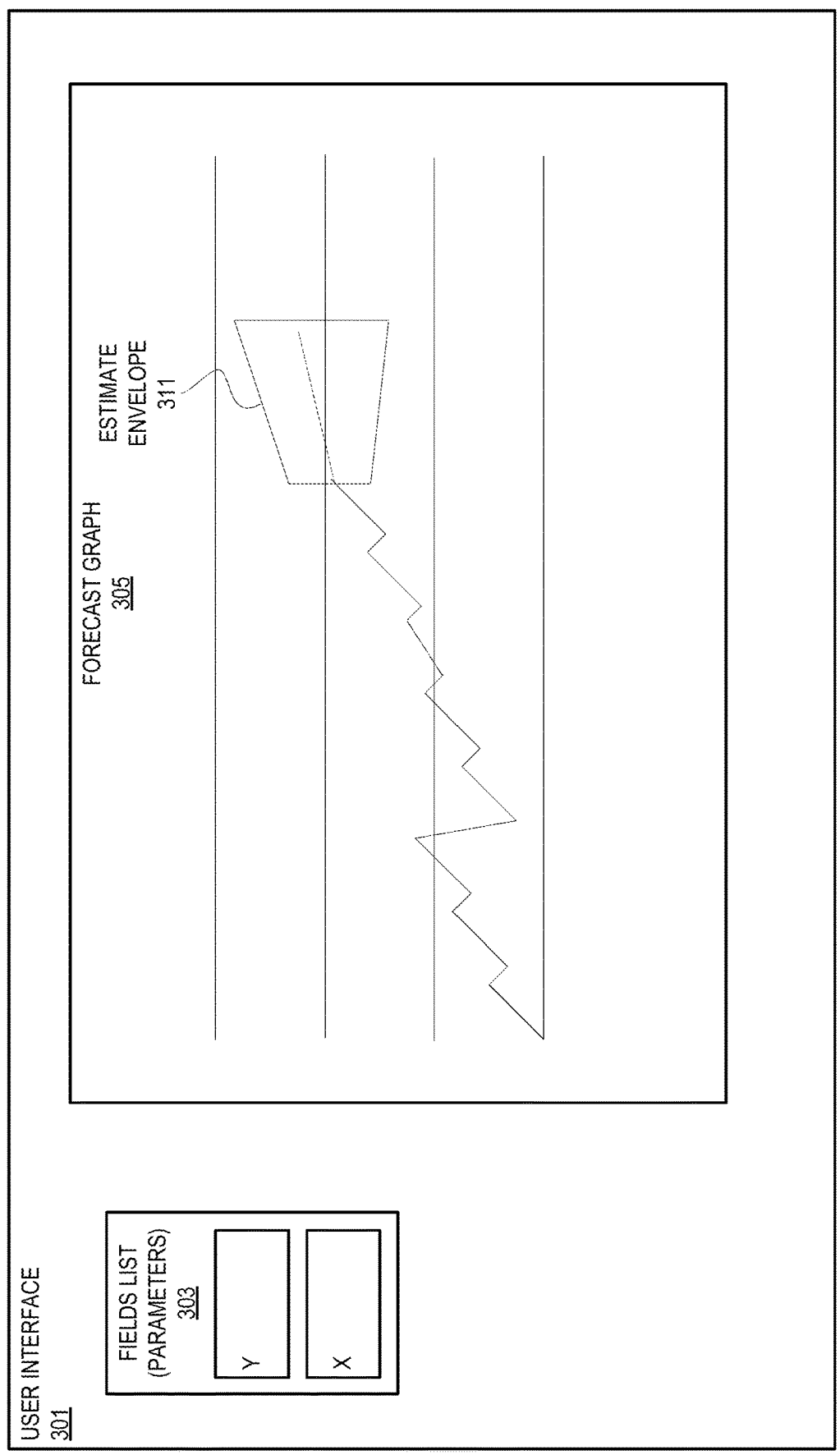
FIG. 3 illustrates an embodiment of a graphical user interface for displaying a forecast.

FIG. 3 illustrates an embodiment of a graphical user interface for displaying a forecast. In this example, the forecast is provided by traditional means that does not use RCF, seasonality, and/or two data structures as detailed herein. The user interface 301 includes a list of parameters 303 (the x and y axis of the forecast graph) that are used to determine the forecast graph 305. For example, a heartbeat reading (y axis) over time (x axis).

The solid line in the forecast graph 305 is known time series data. The dashed line represents the forecast in the forecast graph 305. As shown, the estimate has a large possible deviation as shown in the estimate envelope 311.

Figure 4:
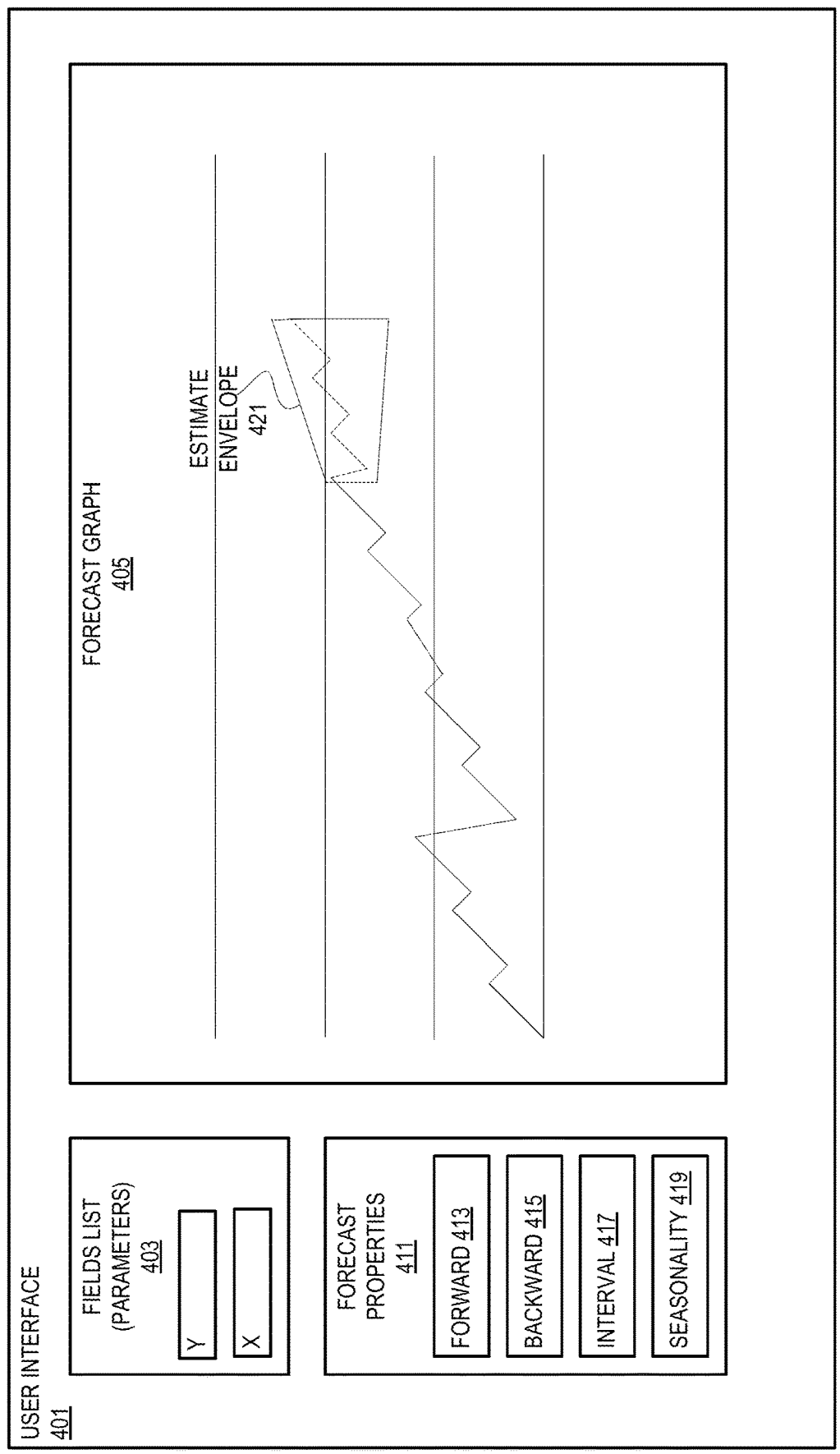
FIG. 4 illustrates an embodiment of a graphical user interface for displaying a forecast.

FIG. 4 illustrates an embodiment of a graphical user interface for displaying a forecast. In this example, the forecast is provided by a data forecast and/or anomaly detection service (or services) 105 or data forecast and/or anomaly detection engine 205. The user interface 401 includes a list of definable parameters 403 (the x and y axis of the forecast graph) that are used to determine the forecast graph 405. For example, a heartbeat reading (y axis) over time (x axis).

Additionally, the user interface 401 includes one or more definable forecast properties 411. For example, whether the forecast is forward 413 (and the number or periods to forecast) or backward 415 (and the number or periods to forecast), and the prediction interval 417 of the forecast. Backward forecasts allow for a confirmation of the relative accuracy of the forecasting algorithm executed by the data forecast and/or anomaly detection service (or services) 105 or data forecast and/or anomaly detection engine 205. Additionally, the seasonality 419 to use may be set to automatic or customized.

The solid line in the forecast graph 405 is known time series data. The dashed line represents the forecast in the forecast graph 405. As shown, the estimate has a smaller possible deviation as shown in the estimate envelope 421.

Figure 5:
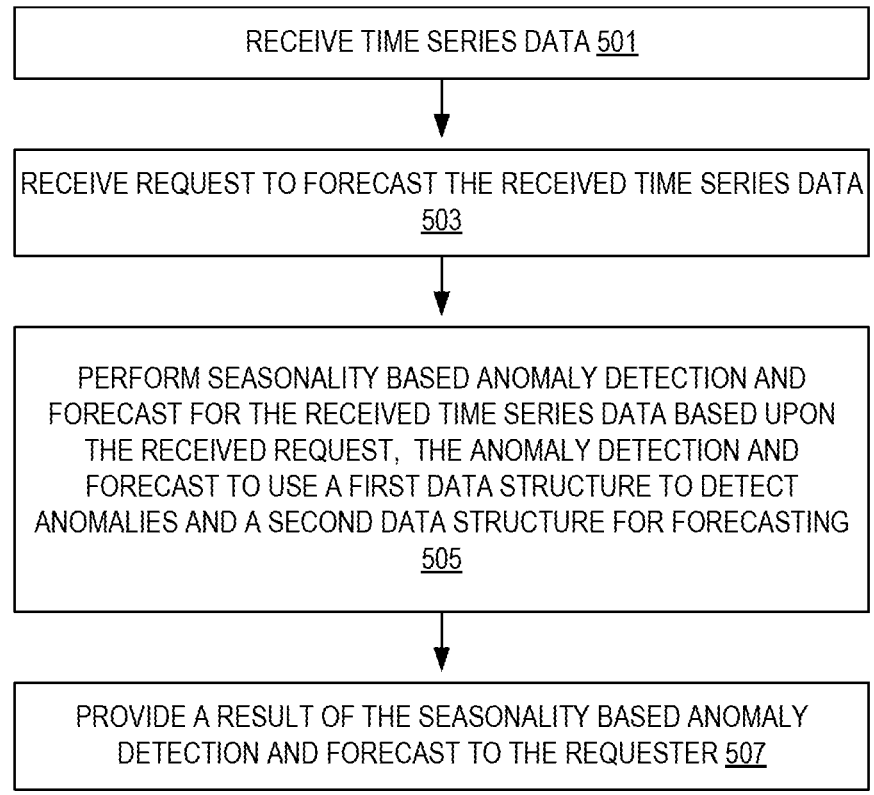
FIG. 5 illustrates embodiments of a method performed by a data forecast and/or anomaly detection service (or services) or data forecast and/or anomaly detection engine.

FIG. 5 illustrates embodiments of a method performed by a data forecast and/or anomaly detection service (or services) 105 or data forecast and/or anomaly detection engine 205. Typically, the method is implemented as software code that is executed by one or more processors.

At 501, time series data is received. For example, time series data is received by a front end or input/output mechanisms.

A request to forecast the received time series data is received at 503. For example, in some embodiments, a user provides a request through a user interface such as that detailed earlier. In other embodiments, the request is received in the form of an application programming interface (API) call. The request may include several pieces of information, including but not limited to, one or more of the following: an identification of the time series data to be forecasted, an indication of the directionality of the forecast (forward or backward), an indication of the number of periods to forecast, an indication of seasonality choice (automatic or customized), and/or an interval.

At 505, seasonality-based anomaly detection and forecast for the received time series data based upon the received request is performed using RCF. The anomaly detection and forecasting use two data structures such as those detailed above. A detailed embodiment of this performance is discussed with respect FIG. 6. In some embodiments, the anomaly detection and forecasting is performed on the forecast data structure, wherein the forecast data structure has been updated to reflect anomalies found in the anomalies detection data structure for the input from the received time series data.

A result of the seasonality-based anomaly detection and forecast for the received time series data is provided to the requester at 507. For example, a forecast graph is generated and provided to the requester.

Figure 6:
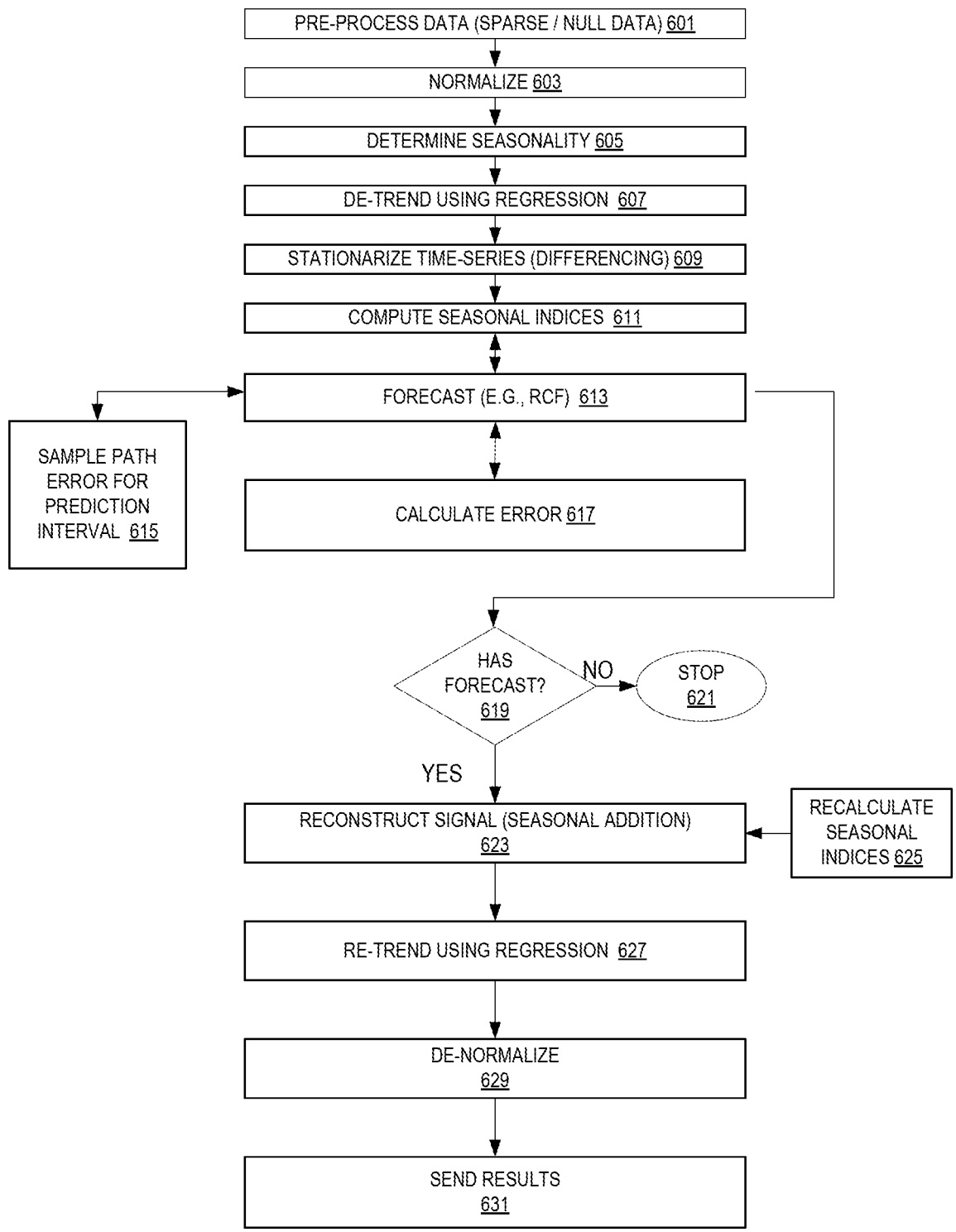
FIG. 6 illustrates embodiments of a method for performing seasonality-based anomaly detection and forecasting on received time series data.

FIG. 6 illustrates embodiments of a method for performing seasonality-based anomaly detection and forecasting on received time series data.

At 601, the anomaly data structure is pre-processed to generate the forecast data structure. In particular, sparse/sporadic anomalies are filtered out such that they do not impact the forecast. In some embodiments, actions of 1105 (FIG. 11) are performed.

The forecast data structure is then normalized at 603. For example, in some embodiments, the time series data of the forecast data structure is normalized to lie within 0.1 and 1.1 on each dimension.

Seasonality is determined (when not provided) at 605. The seasonality can be different for different dimensions. Seasonality is found by finding periodicity in the data (e.g., based on L2-square distance) to determine a shingle size. In some embodiments, the shingle is rotated to better align with the seasonality. FIG. 7 illustrates an embodiment of seasonality determination in detail.

When there is a trend, it is pulled out using regression at 607. This helps detect increases in variations.

At 608, when there is a detection that the variations are increasing (or that seasonality is 1), then differencing is performed.

Seasonal indices are computed at 611. In some embodiments, this is a computation of how much a particular season tends to differ from the average.

A sample path error for the prediction interval of the forecast is provided to the forecasting (e.g., RCF) routine at 615. In some embodiments, this error represents a per data point distribution of error. For example, the estimate envelope of FIG. 4.

An error for the forecast routine is calculated at 617. In some embodiments, this error is generated by comparing the forecast to the actual data of the data set.

The forecasting routine is performed, per data point to forecast, at 613 (details of RCF have been discussed above). The result of the forecast for the point is then used to update the seasonal indices at 611, the sample path error at 615, and the error for the forecast at 617. The updated values are fed back into the forecasting routine for the next data point to forecast.

A determination of if a forecast for a data point has been generated is made at 619. When the routine fails to generate a forecast, the method is stopped at 621 and no forecast information is output. When the forecasting is successful, the signal including the forecasted data is to be reconstructed at 623 using seasonal addition as needed. For example, when differencing is performed at 609, then these differences are to be added back at 623. In some embodiments, recalculated seasonal indices 625 are provided for this addition to "smooth" the data.

The signal is then retrended using regression at 627 and de-normalized at 629.

Finally, at 631, the results of the forecasting are provided to the requester. For example, in the format of a graphical user interface output.

FIG. 8 illustrates a table showing the impact of missing values on anomaly scores using the above detailed approaches. Each row represents time series data at a particular time for particular actors (columns) An anomaly score 801 computed using traditional means is shown. Columns of data are removed per row and a new anomaly score 803 is calculated using embodiments detailed herein. As shown, the new anomaly score 803 is very similar to the original score 801 regardless of what has been removed.

FIG. 9 illustrates a table showing the impact of missing values on anomaly scores using the above detailed approaches for normalized data. Normalization reduces the impact of aapl from FIG. 8. Each row represents time series data at a particular time for particular actors (columns). An anomaly score 901 computed using traditional means is shown. Columns of data are removed per row and a new anomaly score 903 is calculated using embodiments detailed herein. As shown, the new anomaly score 903 is very similar to the original score 901 regardless of what has been removed.

FIG. 10 illustrates an example of the time series data of FIG. 9 with selected data removed. As shown, the time series data 1001 has some data missing for each timestamp. This correlates to the "Removed" column of FIG. 9.

Note that the embodiments detailed utilize stochastic bit-complexity. In particular, there is a focus on the point-forecasting problem that given t observations $x_1$, $x_2$, $x_3$, ..., $x_t$ and a desire to simultaneously forecast $x_{t+1}$, $x_{t+2}$, $x_{t+3}$, ..., $x_{t+T}$ where T≥1 is the leadtime of the forecast. In the context of providing an abstract non-parametric model for forecasting, a forecast of $x_{t+1}$, $x_{t+2}$, $x_{t+3}$, ..., $x_{t+T}$ is an ideal forecast if it causes the least increase in the (bit) complexity of the joint representation $x_{t+1}$, $x_{t+2}$, $x_{t+3}$, ..., $x_{t+T}$, i.e., the data adjoined with the forecast.

Figure 11:
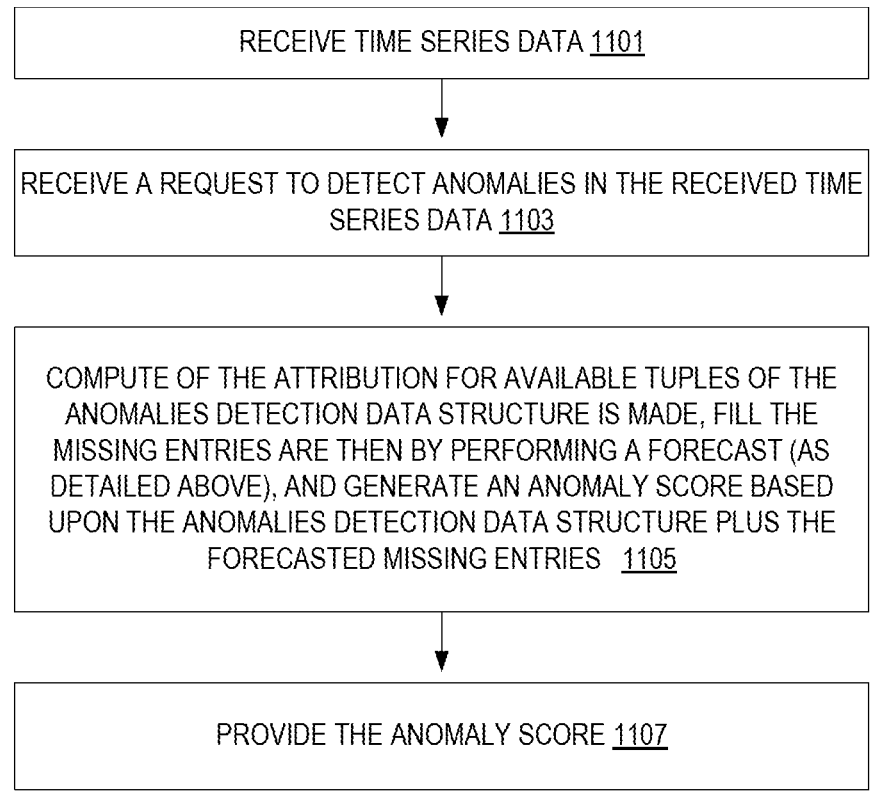
FIG. 11 illustrates embodiments of a method for detecting at least one anomaly in time series data and providing an anomaly score.

FIG. 11 illustrates embodiments of a method for detecting at least one anomaly in time series data and providing an anomaly score. In some embodiments, a data forecast and/or anomaly detection service (or services) or data forecast and/or anomaly detection engine performs this method.

At 1101, time series data is received. For example, time series data from an internal or external source is received (and stored). In some embodiments, anomalies detection data structure 113 stores the data. An example of the format of an anomalies detection data structure 113 are found in FIGS. 8-9.

A request to detect anomalies in the received time series data is received at 1103.

A computation of the attribution for available tuples of the anomalies detection data structure is made, the missing entries are then filled up by performing a forecast (as detailed above), and an anomaly score is computed based upon the anomalies detection data structure plus the forecasted missing entries at 1105.

The anomaly score is then provided to the requester at 1107.

This allows for anomalies to be found before they are realized. For example, suppose there are two joined streams; where the first stream has a data item every minute and the second stream has a data item every 15 minutes. Forecasting 15 steps out then as the minute stream is evolving and the broad relationship between the two streams breaks down, anomalies can be detected.

In some embodiments, given one dimensional input f ( ) for time 1, ..., t and a forecast for t+1, ... t+T, a request to raises or decreases the forecast value f (t') to v for some t<t'<t+T is received and the forecast values for the period t+1, ..., t' are interpolated smoothly such that f (t')=v. Based on a target value of f (t+T), a user can find the desired value v or the "goal" at time t'. Alternatively, the program can compute v given a target for f (t+T).

In some embodiments, forecasts are "transferred" across related data sets. For example, suppose that metric one has a lot of data—and metric two does not. Metric one is first forecasted and then that forecast is used to jointly forecast metrics one and two (with the forecast for metric one being dropped).

Figure 12:
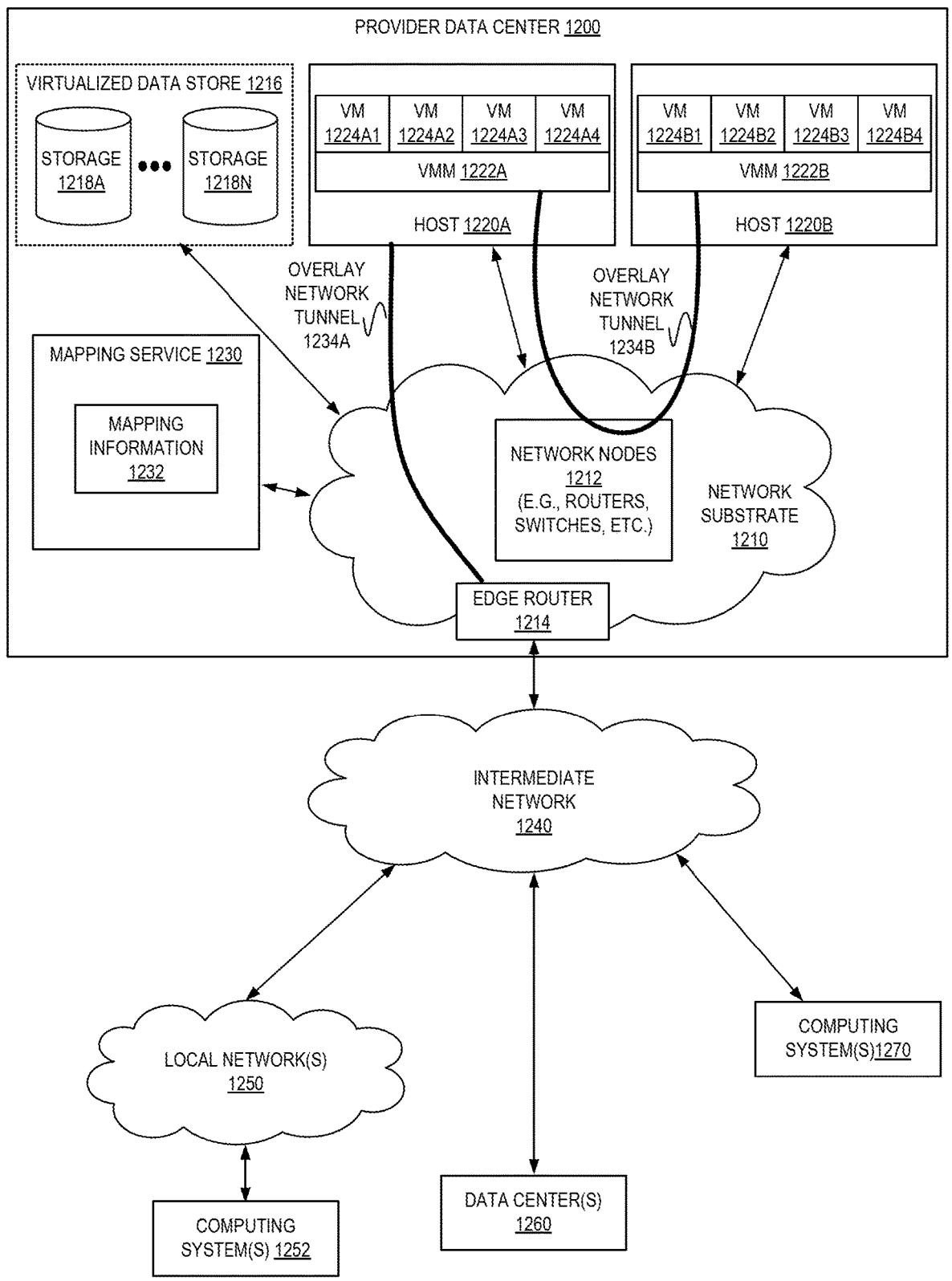
FIG. 12 illustrates an example data center that implements an overlay network on a network substrate using IP tunneling technology according to some embodiments.

FIG. 12 illustrates an example data center that implements an overlay network on a network substrate using IP tunneling technology, according to some embodiments. A provider data center 1200 may include a network substrate that includes networking nodes 1212 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1210 using tunnels. The IP tunneling technology may provide a mapping and encapsulating system for creating an overlay network on a network (e.g., a local network in data center 1200 of FIG. 12) and may provide a separate namespace for the overlay layer (the public IP addresses) and the network substrate 1210 layer (the local IP addresses). Packets in the overlay layer may be checked against a mapping directory (e.g., provided by mapping service 1230) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1230) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 12, an example overlay network tunnel 1234A from a virtual machine (VM) 1224A (of VMs 1224A1-1224A4, via VMM 1222A) on host 1220A to a device on the intermediate network 1250 and an example overlay network tunnel 1234B between a VM 1224A (of VMs 1224A1-1224A4, via VMM 1222A) on host 1220A and a VM 1224B (of VMs 1224B1-1224B4, via VMM 1222B) on host 1220B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 12, at least some networks in which embodiments may be implemented may include hardware virtualization technology that enables multiple operating systems to run concurrently on a host computer (e.g., hosts 1220A and 1220B of FIG. 12), i.e. as virtual machines (VMs) 1224 on the hosts 1220. The VMs 1224 may, for example, be executed in slots on the hosts 1220 that are rented or leased to customers of a network provider. A hypervisor, or virtual machine monitor (VMM) 1222, on a host 1220 presents the VMs 1224 on the host with a virtual platform and monitors the execution of the VMs 1224. Each VM 1224 may be provided with one or more local IP addresses; the VMM 1222 on a host 1220 may be aware of the local IP addresses of the VMs 1224 on the host. A mapping service 1230 may be aware of (e.g., via stored mapping information 1232) network IP prefixes and IP addresses of routers or other devices serving IP addresses on the local network. This includes the IP addresses of the VMMs 1222 serving multiple VMs 1224. The mapping service 1230 may be centralized, for example on a server system, or alternatively may be distributed among two or more server systems or other devices on the network. A network may, for example, use the mapping service technology and IP tunneling technology to, for example, route data packets between VMs 1224 on different hosts 1220 within the data center 1200 network; note that an interior gateway protocol (IGP) may be used to exchange routing information within such a local network.

In addition, a network such as the provider data center 1200 network (which is sometimes referred to as an autonomous system (AS)) may use the mapping service technology, IP tunneling technology, and routing service technology to route packets from the VMs 1224 to Internet destinations, and from Internet sources to the VMs 1224. Note that an external gateway protocol (EGP) or border gateway protocol (BGP) is typically used for Internet routing between sources and destinations on the Internet. FIG. 12 shows an example provider data center 1200 implementing a network that provides resource virtualization technology and that provides full Internet access via edge router(s) 1214 that connect to Internet transit providers, according to some embodiments. The provider data center 1200 may, for example, provide customers the ability to implement virtual computing systems (VMs 1224) via a hardware virtualization service and the ability to implement virtualized data stores 1216 on storage resources 1218A-1218N via a storage virtualization service.

The data center 1200 network may implement IP tunneling technology, mapping service technology, and a routing service technology to route traffic to and from virtualized resources, for example to route packets from the VMs 1224 on hosts 1220 in data center 1200 to Internet destinations, and from Internet sources to the VMs 1224. Internet sources and destinations may, for example, include computing systems 1270 connected to the intermediate network 1240 and computing systems 1252 connected to local networks 1250 that connect to the intermediate network 1240 (e.g., via edge router(s) 1214 that connect the network 1250 to Internet transit providers). The provider data center 1200 network may also route packets between resources in data center 1200, for example from a VM 1224 on a host 1220 in data center 1200 to other VMs 1224 on the same host or on other hosts 1220 in data center 1200.

A service provider that provides data center 1200 may also provide additional data center(s) 1260 that include hardware virtualization technology similar to data center 1200 and that may also be connected to intermediate network 1240. Packets may be forwarded from data center 1200 to other data centers 1260, for example from a VM 1224 on a host 1220 in data center 1200 to another VM on another host in another, similar data center 1260, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1218A-1218N, as virtualized resources to customers of a network provider in a similar manner.

Figure 13:
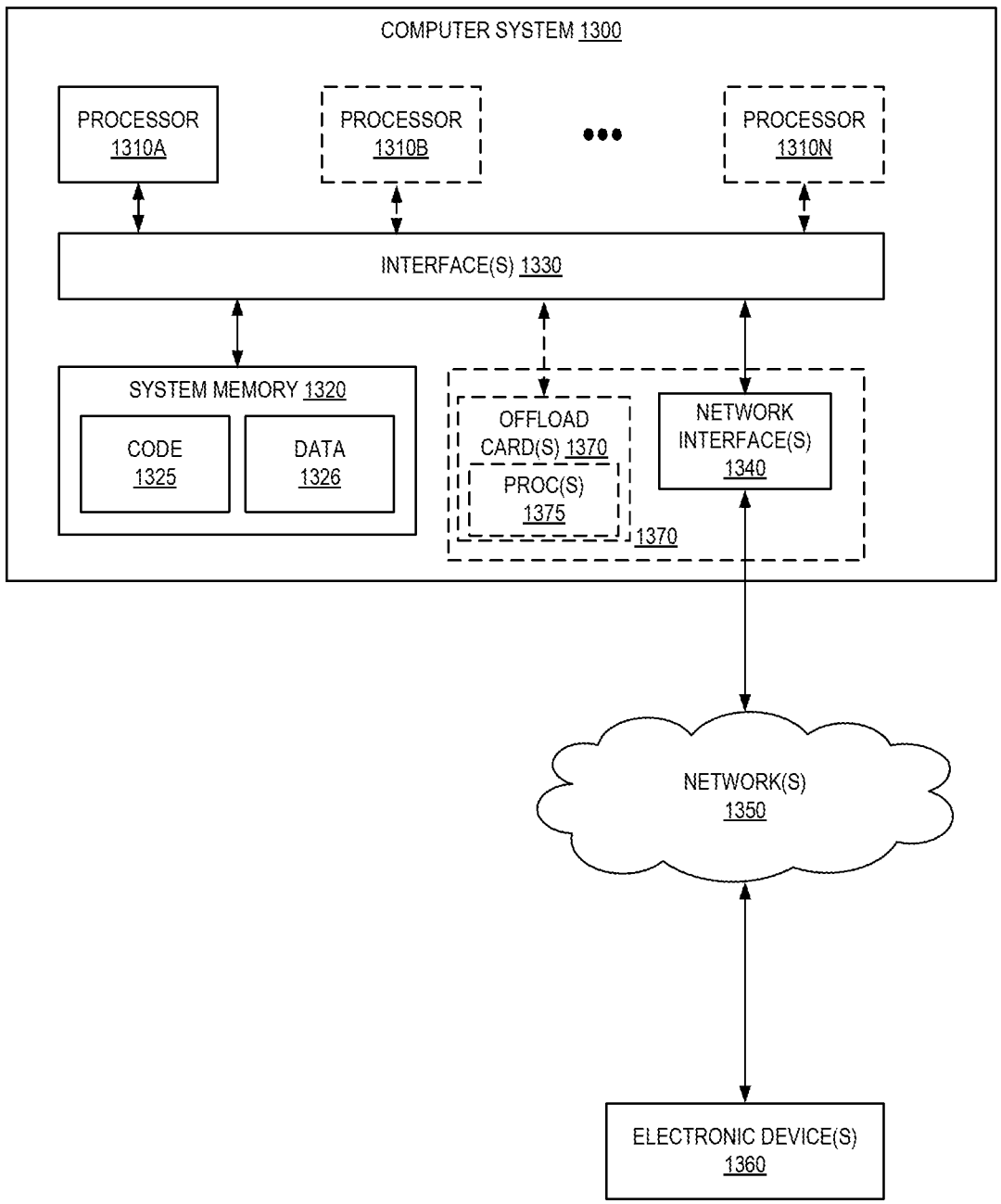
FIG. 13 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
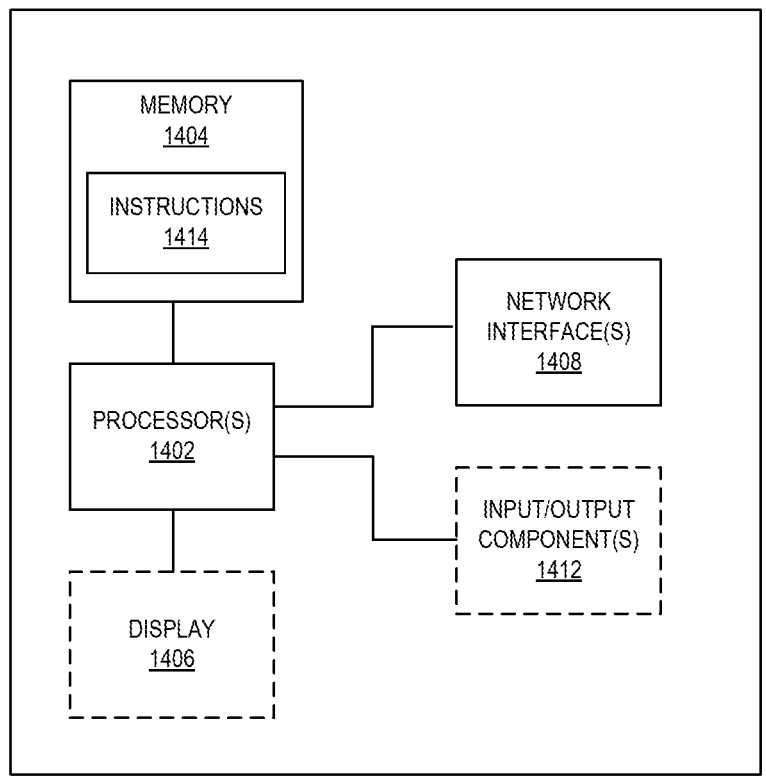
FIG. 14 illustrates a logical arrangement of a set of general components of an exemplary computing device that can be utilized in accordance with various embodiments.

FIG. 14 illustrates a logical arrangement of a set of general components of an example computing device 1400 such as the services of web services provider detailed above, the device detailed above, etc. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (e.g., instructions 1414) and/or data, and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1414) for execution on the set of one or more processors 1402 of that electronic device. One or more parts of various embodiments may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some embodiments include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 15:
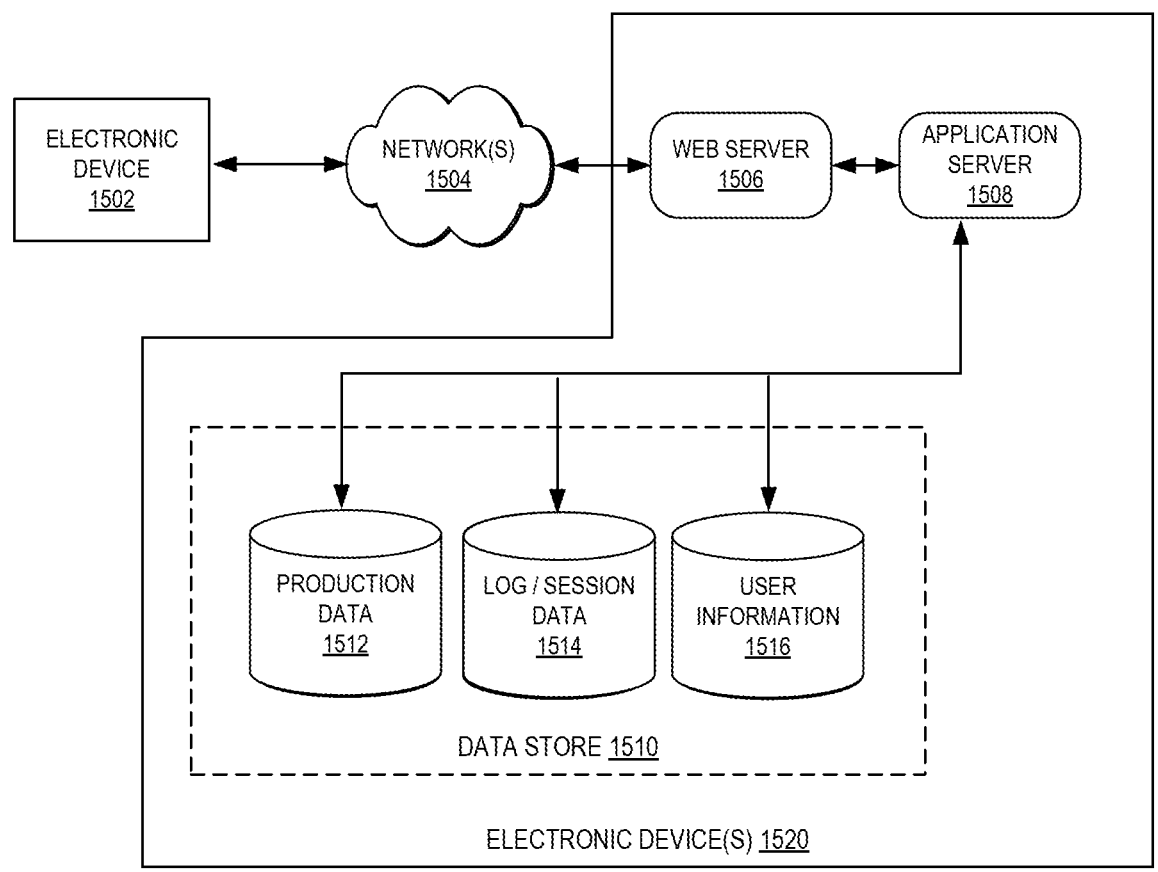
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments requests are HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving time series data;
storing the received time series data in an anomalies detection data structure;
receiving a request to generate a forecast for the received time series data;
filtering out one or more sparse anomalies from the received time series data;
storing in a forecast data structure a representation of the time series data excluding the one or more sparse anomalies filtered from the received time series data;
performing a seasonality-based anomaly detection and forecast for the received time series data based upon the received request, the seasonality-based anomaly detection and forecasting to utilize the forecast data structure; and
displaying a result of the forecast as a forecast graph.

2. The computer-implemented method of claim 1, wherein the request includes at least one of: an identification of the time series data to be forecasted, an indication of a directionality of the forecast, an indication of a number of periods to forecast, an indication of seasonality choice, and an interval.

3. The computer-implemented method of claim 1, wherein the seasonality-based anomaly detection and forecast is performed using a random cut forest function.

4. A computer-implemented method comprising:
receiving a request to generate a forecast for received time series data;
performing a seasonality-based anomaly detection and forecast for the received time series data based upon the received request, the seasonality-based anomaly detection and forecasting comprising filtering out one or more sparse anomalies from the received time series data, the seasonality-based anomaly detection and forecasting to utilize a second data structure that stores a representation of the time series data with the exclusion of the one or more sparse anomalies in the received time series data, the received time series data stored in a first data structure; and
providing a result of the performed seasonality-based anomaly detection and forecast.

5. The computer-implemented method of claim 4, wherein the request includes at least one of: an identification of the time series data to be forecasted, an indication of a directionality of the forecast, an indication of a number of periods to forecast, an indication of seasonality choice, and an interval.

6. The computer-implemented method of claim 4, wherein the seasonality-based anomaly detection and forecast is performed using a random cut forest function.

7. The computer-implemented method of claim 4, wherein the result is provided as a forecast graph.

8. The computer-implemented method of claim 4, wherein the result is provided as data.

9. The computer-implemented method of claim 4, wherein performing a seasonality-based anomaly detection and forecast for the received time series data based upon the received request further comprises:
determining the seasonality based on periodicity in the received time series data, the seasonality to determine a shingle size.

10. The computer-implemented method of claim 9, wherein performing a seasonality-based anomaly detection and forecast for the received time series data based upon the received request further comprises:
rotating the shingle to better fit the received time series data.

11. The computer-implemented method of claim 4, wherein performing a seasonality-based anomaly detection and forecast for the received time series data based upon the received request further comprises:
smoothing the result of the forecast.

12. The computer-implemented method of claim 4, further comprising:
receiving time series data; and
storing the received time series data in the first data structure.

13. The computer-implemented method of claim 12, wherein the received time series data is from an external data source and the method is implemented by a web services provider.

14. A system comprising:
storage to store a first and a second data structure, the second data structure to store a representation of time series data excluding at least some sparse anomalies data found filtered from the time series data stored in the first data structure; and
a data forecast and anomaly detection service implemented by a second one or more electronic devices, the data forecast and anomaly detection service including instructions that upon execution are to cause:
a receipt of a request to generate a forecast for the time series data,
a performance of a seasonality-based anomaly detection and forecast for the time series data based upon the received request, the seasonality-based anomaly detection and forecasting to utilize the second data structure, and
providing a result of the performed seasonality-based anomaly detection and forecast.

15. The system of claim 14, wherein the request includes at least one of: an identification of the time series data to be forecasted, an indication of a directionality of the forecast, an indication of a number of periods to forecast, an indication of seasonality choice, and an interval.

16. The system of claim 14, wherein the seasonality-based anomaly detection and forecast is performed using a random cut forest function.

17. The system of claim 14, wherein the result is provided as a forecast graph.

18. The system of claim 14, wherein the result is provided as data.

19. The system of claim 14, wherein the instructions are to further cause a determination of the seasonality based on periodicity in the received time series data, the seasonality to determine a shingle size.

* * * * *